US009534076B2

(12) United States Patent
Morgan et al.

(10) Patent No.: US 9,534,076 B2
(45) Date of Patent: Jan. 3, 2017

(54) FLOORING UNDERLAYMENTS

(75) Inventors: Cinttya L. Morgan, Tomball, TX (US); Paul H. Anderson, Tomball, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1625 days.

(21) Appl. No.: 12/830,953

(22) Filed: Jul. 6, 2010

(65) Prior Publication Data
US 2011/0023763 A1 Feb. 3, 2011

Related U.S. Application Data

(60) Provisional application No. 61/230,010, filed on Jul. 30, 2009.

(51) Int. Cl.
| | | |
|---|---|---|
| *B63B 3/48* | (2006.01) | |
| *B32B 27/38* | (2006.01) | |
| *C08G 59/06* | (2006.01) | |
| *C08G 59/50* | (2006.01) | |
| *C08L 63/00* | (2006.01) | |
| *C08L 63/02* | (2006.01) | |
| *C08K 7/28* | (2006.01) | |
| *C08K 3/34* | (2006.01) | |
| *C08K 3/40* | (2006.01) | |

(Continued)

(52) U.S. Cl.
CPC ............... *C08G 59/50* (2013.01); *C08K 7/28* (2013.01); *C09D 163/00* (2013.01); *C08K 3/0033* (2013.01); *C08K 5/0008* (2013.01); *Y10T 428/27* (2015.01)

(58) Field of Classification Search
USPC ..................................... 528/87, 88, 103–105
See application file for complete search history.

(56) References Cited

U.S. PATENT DOCUMENTS

| | | |
|---|---|---|
| 4,133,854 A | 1/1979 | Hendricks |
| 4,199,909 A | 4/1980 | Kotcharian |
| | (Continued) | |

FOREIGN PATENT DOCUMENTS

| | | |
|---|---|---|
| WO | 03057753 | 7/2003 |
| WO | 03091325 | 11/2003 |

OTHER PUBLICATIONS

"Performance Specification Deck Covering Underlay Materials," Sep. 18, 2008, Military Specification MIL-PRF-3135H.*

(Continued)

*Primary Examiner* — Randy Gulakowski
*Assistant Examiner* — Ha S Nguyen
(74) *Attorney, Agent, or Firm* — Fletcher Yoder P.C.

(57) ABSTRACT

Flooring underlayments may be formed by combining an epoxy based resin component, a curing agent component, and an aggregate component. The resulting underlayment may be a lightweight material with a low viscosity that allows the underlayment to be self-leveling. Further, the underlayment may be designed for application in both wet and dry spaces. In certain embodiments, the underlayment may have a weight less than approximately 7.8 kg/m² (1.6 lb/ft²) when applied at a nominal thickness of 0.635 cm (0.25) inches. Moreover, the underlayment may be designed to conform to the SOLAS requirements administered by the International Maritime Organization (IMO). Specifically, the underlayment may be designed to conform to IMO Resolution MSC.61(67).

26 Claims, 2 Drawing Sheets

(51) Int. Cl.
   *C09D 163/00* (2006.01)
   *C09D 163/02* (2006.01)
   *C08K 3/00* (2006.01)
   *C08K 5/00* (2006.01)

(56) References Cited

U.S. PATENT DOCUMENTS

| | | |
|---|---|---|
| 4,214,332 A | 7/1980 | Stoner |
| 4,689,358 A | 8/1987 | Schorr et al. |
| 4,919,866 A | 4/1990 | Kubbutat |
| 5,090,351 A | 2/1992 | Goldbach et al. |
| 5,185,013 A | 2/1993 | Martin |
| 6,287,669 B1 | 9/2001 | George et al. |
| 2001/0043996 A1 | 11/2001 | Yamada et al. |
| 2003/0153643 A1* | 8/2003 | Jin et al. ............ 522/81 |
| 2004/0006944 A1* | 1/2004 | Miyamoto ......... 52/506.01 |
| 2005/0090626 A1* | 4/2005 | Liu et al. .......... 525/529 |
| 2005/0209357 A1* | 9/2005 | Xu et al. ............ 522/71 |
| 2005/0281999 A1* | 12/2005 | Hofmann et al. ...... 428/304.4 |
| 2006/0178463 A1* | 8/2006 | Sacks ............... 524/444 |
| 2006/0258781 A1* | 11/2006 | Beach et al. ......... 523/223 |
| 2008/0039552 A1* | 2/2008 | Priegel ............. 523/218 |
| 2009/0226729 A1* | 9/2009 | Niimoto et al. ....... 428/416 |

OTHER PUBLICATIONS

"Adoption of the International Coade for Application of Fire Test Procedures," adopted Dec. 5, 1996, International Maritime Organization Resolution MSC.61(67).*

Palumbo, Michel et al., On the Compressive Elasticity of Epoxy Resins Filled with Hollow Glass Microspheres, Journal of Applied Polymer Science, 1996, vol. 60, pp. 47-53.

* cited by examiner

FLOORING UNDERLAYMENTS

CROSS REFERENCE TO RELATED APPLICATIONS

This application claims priority from and the benefit of U.S. Provisional Patent Application Ser. No. 61/230,010, entitled "FLOORING UNDERLAYMENTS", filed Jul. 30, 2009, which is hereby incorporated by reference.

BACKGROUND

The invention relates generally to flooring underlayments, and more specifically, to epoxy based flooring underlayments.

In general, underlayments may be applied underneath a flooring material, such as ceramic tile, terrazzo, vinyl, or polymeric decking materials to contour the flooring surface. For example, underlayments may be used to smooth surfaces and/or to slope a surface toward a drain. Underlayments may be particularly useful in the construction of ocean-going and/or sea-going vessels, such as cargo vessels and the like, where typically the primary decking surfaces are made of steel plates welded together. Although the steel plates are often welded together to form a generally even surface area, the metal decking may be warped or may have other surface irregularities such as raised weld seams. Underlayments may be applied to the decking surfaces to reduce variations in deck height.

To accommodate various amounts of surface irregularities, underlayments that can be applied in thicker layers may be desired. However, the underlayment thickness may be limited by factors such as drying or curing time, compressive strength, flexibility, weight, and compliance with government and/or customer regulations. For example, underlayment and deck smoothing materials used on commercial maritime vessels may need to be approved under requirements of the International Convention for the Safety of Life at Sea (SOLAS) administered by the International Maritime Organization (IMO). In another example, military maritime vessels may be required to meet Military Specification MIL-PRF-3135 for deck covering underlay materials. Among others, the requirements may include smoke and toxicity standards, flammability standards, and weight limits. Moreover, self-leveling underlayments may be desired to facilitate application. Further, for wet spaces, rather than cemetitious based underlayments, epoxy based underlayments may be preferred for their increased moisture resistance. Accordingly, it may be desirable to provide lightweight, epoxy-based underlayments with relatively low toxicity and flammability properties.

BRIEF DESCRIPTION

The present disclosure is directed to novel epoxy based flooring underlayments. The flooring underlayments may be formed by combining an epoxy based resin component, a curing agent component, and an aggregate component. According to certain embodiments, the epoxy based resin component may be a Bisphenol F based epoxy resin, a Bisphenol A based epoxy resin, or a combination thereof. The curing agent may include one or more amine based curing agents, and the aggregate component may include expanded glass granules and hollow glass microspheres. The expanded glass granules and the hollow glass microspheres may be designed to be suspended within the epoxy based resin component and the curing agent upon mixing to form a self-leveling flooring underlayment.

The resulting underlayment may be a lightweight material with a low viscosity. Further, the underlayment may be designed for application in both wet and dry spaces. In certain embodiments, the underlayment may have a weight less than approximately 7.8 kg/m$^2$ (1.6 lb/ft$^2$) when applied at a nominal thickness of 0.635 cm (0.25) inches. Moreover, the underlayment may be designed to conform to the SOLAS requirements administered by the International Maritime Organization (IMO). Specifically, the underlayment may be designed to conform to IMO Resolution MSC.61(67).

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to epoxy based flooring underlayments. The underlayments may be formed by combining an epoxy based resin component, a curing agent component, and an aggregate component. The resulting underlayment may be a lightweight material with a low viscosity that allows the underlayment to be self-leveling. Further, the underlayment may be designed for application in both wet and dry spaces. In certain embodiments, the underlayment may have a weight less than approximately 7.8 kg/m$^2$ (1.6 lb/ft$^2$) when applied at a nominal thickness of 0.635 cm (0.25) inches. Moreover, the underlayment may be designed to conform to the SOLAS requirements administered by the IMO. Specifically, the underlayment may be designed to conform to the IMO "International Code for Application of Fire Test Procedures," MSC.61(67) adopted on Dec. 5, 1996, and attached hereto as Appendix 1. In particular, the underlayment may be designed to meet the smoke and toxicity test specified in Part 2 of MSC.61(67) and the test for surface flammability specified in Part 5 of MSC.61(67).

Figure 1:
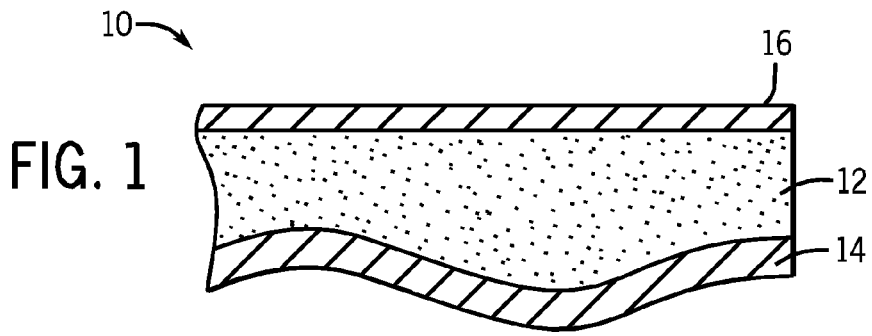
FIG. 1 is a cross-sectional view of a portion of a flooring system employing an embodiment of a flooring underlayment.

FIG. 1 depicts a flooring system 10 employing an embodiment of a lightweight epoxy based underlayment 12. The flooring system 10 may be included within a maritime vessel, such as an ocean-going and/or sea-going vessel, a building, or other suitable structure. The flooring system 10 may be particularly well suited to military or other shipboard applications, and may be applied to wet and dry spaces, such as passageways, shower areas, mess areas, bathrooms, berthing spaces, and galleys, among others. Moreover, the flooring system 10 may be well suited to applications prone to flexing.

The flooring system 10 includes the underlayment 12 applied to a substrate 14, such as a steel deck, or other suitable structure. The substrate 14 may include surface irregularities, warpage, and/or height variations that may be smoothed and/or contoured by applying the underlayment 12 to the substrate 14. The underlayment 12 may have a viscosity that promotes self-leveling of the underlayment 12. That is, before hardening, the underlayment 12 may generally flow along the substrate 14 to fill in surface irregularities, forming a substantially seamless, level surface. However, in other embodiments, a trowel, bull float, or the like may be used on all or some portions of the underlayment 12, to provide a desired contour, such as sloping the underlayment 12 toward a drain. Moreover, in certain embodiments, the underlayment 12 may be used in conjunction with dunnage rails and applied using a screed.

The underlayment 12 may be covered by an optional surface coating 16. The surface coating 16 may include ceramic tile, epoxy terrazzo, vinyl, or polymeric decking materials, among others. According to certain embodiments, the surface coating 16 may include PolySpec® IMO-Approved Primary Deck Covering, commercially available from PolySpec® L.P. of Houston, Tex. However, in other embodiments, the surface coating 16 may be omitted, allowing the underlayment 12 to serve as the surface of the flooring system 10.

Figure 2:
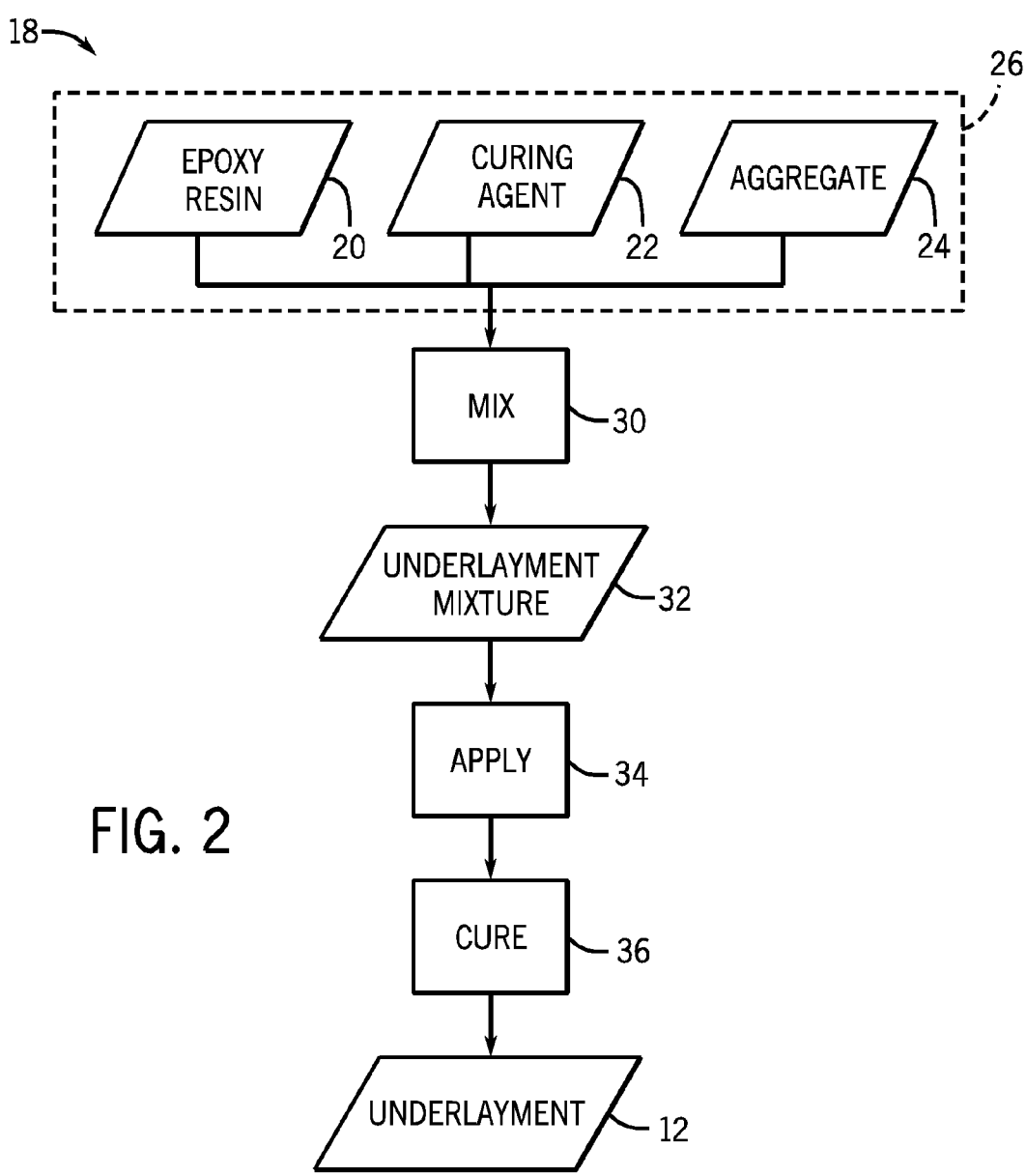
FIG. 2 is a flow chart depicting a method for installing the underlayment of FIG. 1.

FIG. 2 depicts a method 18 for installing the underlayment 12. The underlayment 12 may be prepared with an epoxy resin component 20, a curing agent component 22, and an aggregate component 24. In certain embodiments, the epoxy resin component 20, the curing agent component 22, and the aggregate component 24 may be commercially packaged together and sold as an underlayment kit 26. According to certain embodiments, the underlayment kit 26 may include PolySpec® IMO Ultralite-SL, commercially available from PolySpec® L.P. of Houston, Tex.

The epoxy resin component 20 may include any suitable epoxy based resin, such as a Bisphenol A based epoxy resin, a Bisphenol F epoxy based resin, a modified Bisphenol A based epoxy resin, a modified Bisphenol F epoxy based resin, epoxy novalac based resin, or combinations thereof, among others. Moreover, in certain embodiments, the epoxy based resin may include one or more low viscosity liquid epoxy resins that contain no diluents or modifiers. According to certain embodiments, the epoxy resin component 20 may include one or more epoxidized Bisphenol F resins. For example, the epoxy resin component 20 may include liquid epoxy resins manufactured from epichlorohydrin and Bisphenol F. In another example, the epoxy resin component 20 may include diglycidyl ether of Bisphenol F derived liquid epoxy resin with an epoxide equivalent weight of 160-195 grams per equivalent or a Bisphenol A and epichlorohydrin derived liquid epoxy resin with an epoxide equivalent weight of 180-195 grams per equivalent. According to certain embodiments, the epoxy resin component 20 may include EPON™ Resin 862 and/or EPON™ Resin 828 commercially available from Hexion Specialty Chemicals of Columbus, Ohio; EPALLOY 8220 commercially available from CVC Specialty Chemicals of Moorestown, N.J.; EPOTUF 37-138 commercially available from Reichold, Inc. of Research Triangle Park, N.C.; Pacific 6430 commercially available from Pacific Epoxy Polymers, Inc. of Richmond, Mo.; NAN YA NPEL-128 commercially available from Whitaker Chemicals, LLC of Atlanta, Ga.; Araldite® GY 6010 commercially available from Huntsman Advanced Materials of The Woodlands, Tex.; NPEL-128 commercially available from Anwin Enterprises of Taipei, Taiwan or from Cargile & Co. Ltd. of Taipei, Taiwan; CIBA 6010 commercially available from Ciba Specialty Chemicals of Basel, Switzerland; D.E.R. 354 and/or D.E.R. 331™ commercially available from Dow Chemical Company of Midland, Mich.; or combinations thereof, among others.

The epoxy resin component 20 also may include additional components such as diluents, flame retardants, and/or additives. For example, the diluents may include any suitable diluent, such as glycidyl ethers, glycols, ethers, glycidyl esters, hydrocarbon resins, phthalic esters, phosphoric plasticizers, or other general purpose diluents with low toxicity and low vapor pressure, among others. In another example, the diluents may include aliphatic glycidyl ethers with primarily $C_{12}$ and $C_{14}$ alkyl groups. According to certain embodiments, the diluents may include EPODIL® 748 commercially available from Air Products and Chemicals, Inc. of Allentown, Pa.; Pacific 6748 commercially available from Pacific Epoxy Polymers, Inc. of Richmond, Mo.; Araldite® DY025 commercially available from Huntsman Advanced Materials of The Woodlands, Tex.; or combinations thereof, among others. In certain embodiments, the diluents may be intended to achieve a viscosity for the underlayment 12 that allows the underlayment 12 to be self-leveling.

The epoxy resin component 20 may include flame retardants, such as organobromines, organochlorines, phosphorous compounds, antimony based compounds, boron compounds, magnesium hydroxide, or aluminum hydroxide/ aluminum trihydrate, isodecyl diphenyl phosphate, or combinations thereof, among others. According to certain embodiments, the flame retardants may include DE-83R™, CD-75P™, BA-59P™, Reogard® 1000, Reogard® 65, Kronitex® CDP, Reofs® NHP, Reogard® BAPP, Zinc Borate 223, Reogard® 460, Microfine®, Pyrobloc® SAP, and/or Fireshield® H commercially available from commercially available from Chemtura Corporation of Middlebury, Conn.; Dechlorane® Plus 515, Dechlorane® Plus 25, and/or Dechlorane® Plus 35 commercially available from Occidental Chemical Corporation of Niagara Falls, N.Y.; Santicizer® 148 and/or Santicizer® 141 commercially available from Ferro Corporation of Cleveland, Ohio; Thermoguard® S commercially available from Laurel Industries of Highland Park, Ill.; Timonox® commercially available from Crown Trade of Darwen, Lancashire; FireBrake® ZB, FireBrake® ZB Fire; and/or FireBrake® ZB 500 commercially available from U.S. Borax Inc. of Valencia, Calif.; VERTEX® 60ST, VERTEX® 100SA, VERTEX® 60, ZEROGEN® 50, ZEROGEN® 50SP, HYFIL® 10, HYMOD® SB 432, Hydrated Alumina SB 432, and/or Hydrated Alumina SB 632 commercially available from Huber Engineered Materials of Atlanta, Ga.; Ultramag Magnesium Hydroxide commercially available from Cimbar Performance Minerals of Cartersville, Ga.; or combinations thereof, among others.

The flame retardants may be designed to facilitate compliance of the underlayment 12 with the Smoke and Toxicity Test set forth in IMO MSC.61(67), Part 2 and/or with the Test for Surface Flammability set forth in IMO MSC.61(67), Part 5 (see Appendix 1). Further, the flame retardants may be intended to facilitate compliance of the underlayment 12 with the requirements of Military Specification MIL-PRF-3135H, attached hereto as Appendix 2. More specifically, the flame retardants may be designed to facilitate compliance with the fire resistance requirements specified in MIL-STD-1623E (SH), attached hereto as Appendix 3.

The epoxy resin component 20 may include additives, such as air release additives, flow additives, pigments, and the like. In certain embodiments, the additives may enhance thixotropy, facilitate dispersion and/or wetting, inhibit foaming, and/or reduce viscosity of the underlayment 12. According to certain embodiments, the additives may include BYK®-410, DISPERBYK®-111, and/or BYK-A 530 commercially available from BYK-Chemie GmbH of Wesel, Germany. The additives also may include pigments, such as yellow oxides and/or red iron oxides, among others. However, in other embodiments, the type of pigments employed may vary depending on the desired color of the underlayment 12. According to certain embodiments, the epoxy resin component 20 may include Mapico® Micronized Synthetic Yellow Iron Oxide 1050A commercially available from Rockwood Pigments of Beltsville, Md.

In addition to the epoxy resin component 20, the underlayment kit 26 may include a curing agent component 26. The curing agent component 26 may include one or more suitable curing agents designed for use with an epoxy resin. For example, the curing agent component 26 may include waterborne curing agents, aliphatic amines, cycloaliphatic amines, amidoamines, polyamides, tertiary amines, or combinations thereof, among others. According to certain embodiments, the curing agent component 26 may include Versamine® C31, Versamine® 1000, and/or Versamine® EH30 commercially available from Cognis of Cincinnati, Ohio; Amicure® DBUE commercially available from Hoffmann Mineral GmbH of Neuberg, Germany; Ancamine® 2432, Ancamine® K54, Anquamine 401, Anquamine 701, Anquamine 721, Anquamine 731, Anquamine 287, Anquamine 360, Anquamine 419, Anquamine 100, Ancamine® 2489, Ancamine® 2505, Ancamine® 2519, Ancamine® 2579, Ancamine® 2587, and/or Ancamine® 2605 commercially available from Air Products and Chemicals, Inc. of Allentown, Pa.; EPI-REZ 3510-W-60, EPI-REZ 3515-W-60, EPI-REZ 3519-W-50, EPI-REZ 3522-W-60, EPI-REZ 3540-W-55, EPI-REZ 3551-W-43, EPI-REZ 5003-W-55, EPI-REZ 5520-W-60, EPI-REZ 6006-W-70, EPI-REZ WD-510, and/or EPI-REZ WD-512 commercially available from Hexion Specialty Chemicals of Columbus, Ohio; and combinations thereof, among others. In certain embodiments, the curing agent component 22 also may include flame retardants, such as isodecyl diphenyl phosphate, for example, Santicizer® 148 commercially available from Ferro Corporation of Cleveland, Ohio, and/or any of the other flame retardants described above with respect to the epoxy resin component 20, among others.

The underlayment kit 26 also may include the aggregate component 24. The aggregate component 24 may generally include porous granules with a porous and/or rough outer surface designed to allow absorption of liquid into the granule surface. For example, the aggregate component 24 may include granules, such as expanded glass beads, pretreated expanded glass beads, water pretreated expanded glass beads, expanded clay, hollow glass spheres, or combinations thereof, among others. According to certain embodiments, the aggregate component 24 may include 0.1 to 0.5 mm Poraver® granules, commercially available from Poraver of Ontario, Canada. However, in other embodiments, any suitable size granules may be included in the aggregate component 24. For example, the aggregate component 24 may include granules where the largest cross-sectional diameter ranges from approximately 0.1 to 2 mm, or more specifically, where the largest cross-sectional diameter ranges from approximately 0.1 to 1 mm. In another example, the aggregate component 24 may include granules where the largest cross-sectional diameter is greater than 2 mm. The aggregate component 24 may be designed to absorb or hold water when suspended in the cured epoxy resin, which in turn may improve the fire retardant properties of the underlayment 12, thereby allowing a thicker layer of underlayment 12 to be applied.

In certain embodiments, the aggregate component 24 also may include microspheres. For example, the aggregate component 24 may include lightweight, hollow, spherical, low density, free-flowing alumino-silicate microspheres ranging in size from approximately 5 to 500 microns. The microspheres may be substantially nonporous. According to certain embodiments, the microspheres may include Fillite® 500 commercially available from Trelleborg Fillite of Runcorn, England. However, in other embodiments, any suitable microspheres may be included. The microspheres may be relatively small when compared to the porous granules within the aggregate component 24 allowing the microspheres to fill spaces between the larger porous granules, which in turn may improve the compressive strength of the underlayment 12. The microspheres within the aggregate component 24 also may be intended to improve workability to facilitate a smooth application.

The method 18 may begin by mixing (block 30) the epoxy resin component 20, the curing agent component 22, and the aggregate component 24 to form an underlayment mixture 32. In certain embodiments, the epoxy resin component 20 and the curing agent component 22 may be premixed, for example, for approximately 1 to 2 minutes with a Jiffy® Mixer, and then the mixture of the epoxy resin component 20 and the curing agent component 22 may be added to the aggregate component 24. For example, the underlayment kit 26 may include a large pail that contains the aggregate component 24 and individual containers containing the epoxy resin component 20 and the curing agent component 22. In this example, the curing agent component 22 may be added to the container holding the epoxy resin component 20 and the curing agent component 22, and the epoxy resin component 20 may be premixed in the epoxy resin container. The mixture may then be poured into the pail containing the aggregate component 24. The aggregate component 24 and the mixture of epoxy resin component 20 and curing agent component 22 may then be mixed, for example, for approximately 2 minutes using a Jiffy® Mixer.

In other embodiments, the epoxy resin component 20, the curing agent component 22, and the aggregate component 24 may be mixed together in another order and/or mixed together in a single step. Moreover, any suitable mixing tool, such as a ½-inch drill motor or a mortar mixer, may be employed. Further, the mixing times may vary depending on the times required to ensure thorough mixing and/or to ensure that all particles of the aggregate component 24 have been wet by the epoxy resin component 20 and the curing agent component 22.

The underlayment mixture 32 produced by mixing (block 30) may then be applied (block 34), for example, to the substrate 14 shown in FIG. 1. In certain embodiments, the substrate 14 may be cleaned, scrubbed, and/or prepped prior to application of the underlayment mixture 32. Moreover, in some embodiments, a primer, such as PolySpec® IMO-Approved Deck Primer commercially available from Poly-Spec of Houston, Tex., may be applied to the substrate 14 prior to application of the underlayment mixture. However, in other embodiments, the underlayment mixture 32 may be applied (block 34) directly to the substrate 14. The underlayment mixture 32 may then be applied, for example, by a self-leveling process. The underlayment mixture 32 may be applied to the desired thickness, for example, greater than approximately 0.318-0.635 centimeters (0.125-0.25 inches). In certain embodiments, the underlayment mixture 32 may be designed for application in ambient temperatures ranging from approximately 10-35° C., or more specifically, for application in ambient temperatures ranging from approximately 16-24° C. Moreover, in some embodiments, the underlayment mixture 32 may be smoothed and/or sloped to drain during application.

The underlayment mixture 32 may then be allowed to cure (block 36). For example, the underlayment mixture 32 may be allowed to cure for at least fourteen hours, or until hard, to produce the underlayment 12. During curing, the underlayment mixture 32 may form a tenacious bond with the substrate 14. As described above with respect to FIG. 1, an optional surface coating 16 may then be applied.

The resulting underlayment 12 may be a lightweight material that resists wear from tough traffic and adverse conditions. According to certain embodiments, the underlayment 12 may weigh less than 7.8 kg/m$^2$ (1.6 lb/ft$^2$) when applied at a nominal thickness of 0.635 cm (0.25) inches, or even more specifically, the underlayment may weigh less than or equal to 4.9 kg/m$^2$ (1 lb/ft$^2$) when applied at a nominal thickness of 0.635 cm (0.25 inches). Further, according to certain embodiments, the underlayment 12 may have a weight of approximately 5.4 to 6.3 kg/m$^2$ (1.1 to 1.3 lb/ft$^2$). In certain embodiments, the underlayment 12 may have a compressive strength of approximately 2000-25000 psi per ASTM C579-01, a flexural strength of approximately 1200-1400 psi per ASTM C293-08, and/or a tensile strength of approximately 600-800 psi per ASTM D412-06ae2. The underlayment 12 also may have less than or equal to 250 grams of volatile organic content (VOC) per liter. More specifically, the underlayment may have zero volatile organic content (VOC), and may be free of hazardous solvents. Further, the underlayment 12 may exhibit substantially little or no porosity, making the underlayment 12 ideal for wet or damp spaces. The underlayment 12 also may be fire resistant. Some or all of the above described properties may facilitate compliance with government and/or customer regulations. Specifically, the underlayment 12 may comply with IMO Resolution MSC.61(67) adopted on Dec. 5, 1996. More specifically, the underlayment 12 may comply with the Smoke and Toxicity Test specified in Part 2 of IMO MSC.61 (67) and/or the Test for Surface Flammability specified in Part 5 of IMO MSC.61(67), as set forth in Appendix 1. The underlayment 12 also may comply with the requirements for Class 2 Type I and/or Class 2 Type II underlay materials specified in military standard MIL-PRF-3135H, as set forth in Appendix 2. Further, the underlayment 12 may meet the fire resistance requirements specified in MIL-STD-1623E (SH) for underlay materials (category "Deck Coverings", material "Underlay"), as set forth in Appendix 3.

Figure 3:
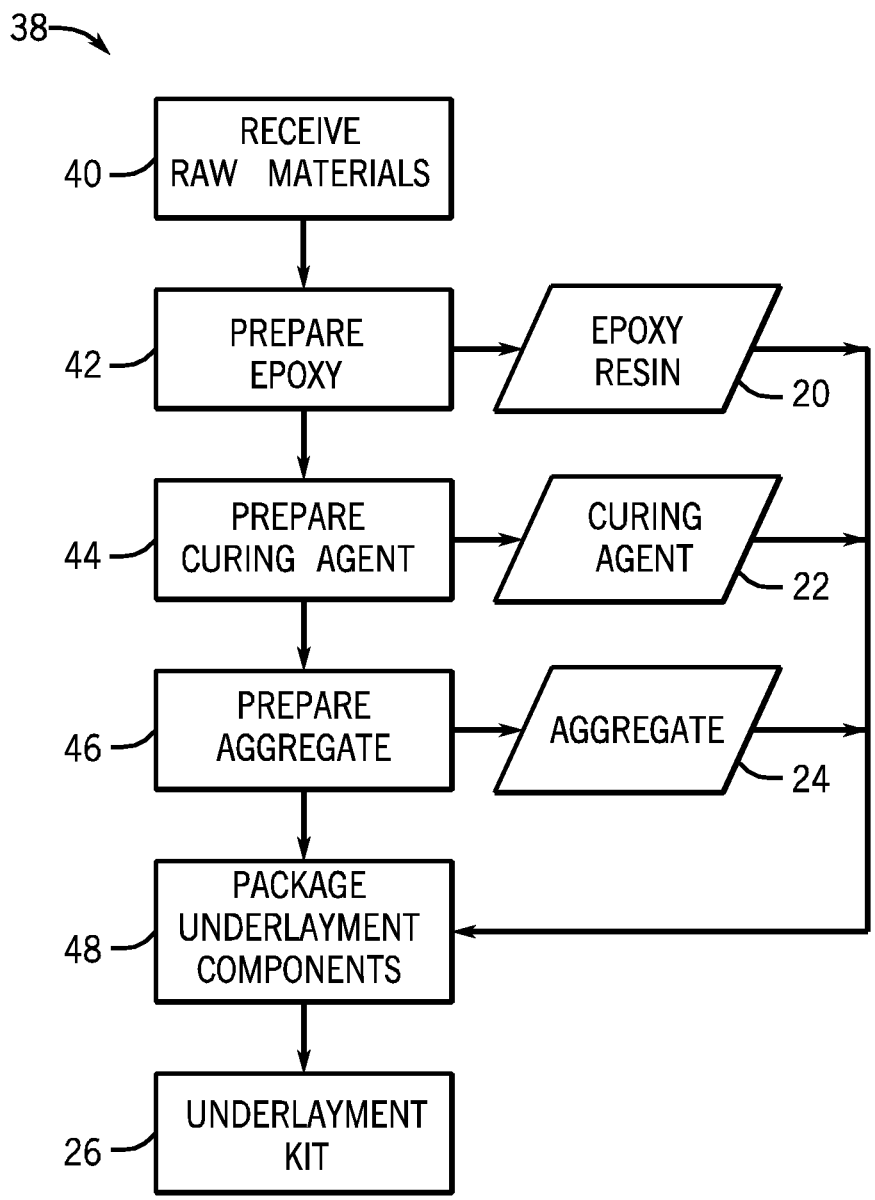
FIG. 3 is a flow chart describing a method for preparing an underlayment kit that may be employed to install the underlayment of FIG. 1.

FIG. 3 depicts a method 38 for making the underlayment kit 26. The method 38 may begin by receiving (block 40) raw materials, such as resins, diluents, flame retardants, additives, curing agents, aggregate granules, and aggregate microspheres, among others. In general, the raw materials may be delivered, for example, in bags, tote bins, drums, tank trucks, rail cars, or by pipeline. The raw materials may be stored on-site in vessels, warehouses, or the like, by a distributor, by the underlayment kit manufacturer, and/or may be used by the underlayment kit manufacturer as the raw materials are received.

The manufacturer may use the raw materials to prepare (block 42) the epoxy resin component 20, to prepare (block 44) the curing agent component 22, and to prepare (block 46) the aggregate component 24. Specifically, the manufacturer may prepare (block 42) the epoxy resin component 20 by combining ingredients, such as one or more epoxy resins, diluents, flame retardants, additives, or combinations thereof, discussed above with respect to FIG. 2. The ingredients may be combined in any order and may be combined by any number of additions. In one example, the liquid components, such as the epoxy based resins and diluents, may first be mixed in one or more steps, and then the powder components, such as the flame retardants and additives may be added in one or more steps. After addition of the powder components, any additional liquid additives may be added in one or more steps. However, in other embodiments, the number of additions and the order for adding the ingredients may vary.

According to certain embodiments, the epoxy resin component 20 may include approximately 20-24 percent by weight of epoxidized Bisphenol F resins, approximately 7-11 percent by weight of glycidyl ether diluents, approximately 65-69 percent by weight of flame retardants, and approximately 0-4 percent by weight of additives. More specifically, the epoxy resin component 20 may include approximately 22 percent by weight of epoxidized Bisphenol F resins, approximately 9 percent by weight of glycidyl ether diluents, approximately 67 percent by weight of flame retardants, and approximately 2 percent by weight of additives. According to certain embodiments, the epoxy resin component 20 may include approximately 20-24 percent by weight of epoxidized Bisphenol F resins, approximately 7-11 percent by weight of glycidyl ether diluents, approximately 13-17 percent by weight of isodecyl diphenyl phosphate, approximately 5-9 percent by weight of a polychlorinated aliphatic compound, approximately 11-15 percent by weight of aluminum trihydrate, approximately 16-20 percent by weight of magnesium hydroxide, approximately 13-17 percent by weight of zinc borate, and approximately 0-4 percent by weight of additives. More specifically, the epoxy resin component may include approximately 22 percent by weight of epoxidized Bisphenol F resins, approximately 9 percent by weight of glycidyl ether diluents, approximately 15 percent by weight of isodecyl diphenyl phosphate, approximately 7 percent by weight of a polychlorinated aliphatic compound, approximately 13 percent by weight of aluminum trihydrate, approximately 18 percent by weight of magnesium hydroxide, approximately 15 percent by weight of zinc borate, and approximately 2 percent by weight of additives.

Table 1 provides an example of a composition of the epoxy resin component 20. However, this example is provided for purposes of illustration and is not intended to be construed as limiting the scope of the techniques. As shown in Table 1, the epoxy resin includes a mixture of epoxidized Bisphenol F resins, and the diluent includes a mixture of glycidyl ether diluents. In this example, one or more of the listed epoxy resins and/or diluents may be employed. Several types of flame retardants including isodecyl diphenyl phosphate, zinc borate, aluminum trihydrate, magnesium hydroxide, and polychlorinated aliphatic compounds are included in the epoxy resin component 20. Further, the epoxy resin component 20 includes wetting and dispersing additives, thixotrope additives, foam reducing additives, and pigment additives.

TABLE 1

Exemplary Composition of Epoxy Resin Component

| Ingredient Type | Ingredient | Weight Percent |
|---|---|---|
| Resin | EPON™ Resin 862, D.E.R. 354, EPALLOY 8220, EPOTUF 37-138, and/or Pacific 6430 (epoxidized Bisphenol F resins) | 21.97 |
| Diluent | EPODIL® 748, Pacific 6748, and/or Araldite® DY025 (glycidyl ether diluents) | 8.79 |
| Flame Retardant | Santicizer® 148 (isodecyl diphenyl phosphate) | 14.72 |
| Flame Retardant | DECHLORANE PLUS 515 (polychlorinated aliphatic compound) | 6.59 |
| Flame Retardant | Hydrated Alumina SB 632 (aluminum trihydrate) | 13.18 |
| Flame Retardant | Ultramag Magnesium Hydroxide (magnesium hydroxide) | 17.58 |
| Flame Retardant | FireBrake® ZB (zinc borate) | 15.38 |
| Additive | Mapico® Micronized Synthetic Yellow Iron Oxide 1050A (pigment) | 0.44 |
| Additive | BYK-A 530 (anti-foam) | 0.44 |
| Additive | DISP BYK 111 (wetting and dispersing) | 0.49 |
| Additive | Red iron oxide (pigment) | 0.22 |
| Additive | BYK 410 (thixotrope) | 0.20 |

The manufacturer may prepare (block 44) the curing agent component 22 by combining ingredients, such as one or more of the epoxy resin curing agents discussed above with respect to FIG. 2. In certain embodiments, the curing agent component 22 also may include one or more of the flame retardants, discussed above with respect to FIG. 2. The ingredients may be combined in any order and/or may be combined by any number of additions.

According to certain embodiments, the curing agent component 22 may include approximately 90-94 percent by weight of amine based and/or waterborne curing agents and approximately 6-10 percent by weight of flame retardants. More specifically, the curing agent component 22 may include approximately 92 percent by weight of amine based and/or waterborne curing agents and approximately 8 percent by weight of flame retardants. Further in certain embodiments, the curing agent component 22 may include approximately 55-59 percent by weight of a cycloaliphatic amine curing agent, approximately 2-6 percent by weight of an aliphatic amine curing agent, approximately 14-18 percent by weight of a polyamine curing agent, approximately 12 to 16 percent by weight of one or more tertiary amine curing agents, and approximately 6-10 percent by weight of isodecyl diphenyl phosphate. More specifically, the curing agent component 22 may include approximately 57 percent by weight of a cycloaliphatic amine curing agent, approximately 4 percent by weight of an aliphatic amine curing agent, approximately 16 percent by weight of a polyamine curing agent, approximately 14 percent by weight of one or more tertiary amine curing agents, and approximately 8 percent by weight of isodecyl diphenyl phosphate.

Table 2 provides an example of a composition of the epoxy resin component 20. However, this example is provided for purposes of illustration and is not intended to be construed as limiting the scope of the techniques. As shown in Table 2, the curing agents include a mixture of cycloaliphatic amines, aliphatic amines, polyamines, and tertiary amines and the flame retardant includes isodecyl diphenyl phosphate.

TABLE 2

Exemplary Composition of Curing Agent Component

| Ingredient Type | Ingredient | Weight Percent |
|---|---|---|
| Curing Agent | Versamine® C31 (cycloaliphatic amine) | 57.38 |
| Curing Agent | Ancamine® 2432 (aliphatic amine) | 4.10 |
| Curing Agent | Versamine® 1000 (polyamine) | 16.39 |
| Curing Agent | Ancamine® K54 and/or Versamine® EH30 (tertiary amines) | 8.81 |
| Curing Agent | Amicure® DBUE (tertiary amine) | 5.12 |
| Flame Retardant | Santicizer® 148 (isodecyl diphenyl phosphate) | 8.20 |

The manufacturer may prepare (block 46) the aggregate component 24 by combining ingredients, such as one or more of the aggregate granules discussed above with respect to FIG. 2. In certain embodiments, the aggregate component 24 also may include one or more of the microspheres, discussed above with respect to FIG. 2. The ingredients may be combined in any order and may be combined by any number of additions.

According to certain embodiments, the aggregate component 24 may include approximately 75 percent by weight of porous granules and approximately 25 percent by weight of microspheres. More specifically, the aggregate component 24 may include approximately 50 percent by weight of porous granules where the largest cross-sectional diameter ranges from approximately 0.25 to 0.5 mm, approximately 25 percent by weight of porous granules where the largest cross-sectional diameter ranges from approximately 0.1 to 0.25 mm, and approximately 25 percent by weight of microspheres with a cross-sectional diameter of approximately 500 microns.

Table 3 provides an example of a composition of the aggregate component 24. However, this example is provided for purposes of illustration and is not intended to be construed as limiting the scope of the techniques. As shown in Table 3, the granules include a mixture of expanded glass granules and the microspheres include alumino-silicate microspheres.

TABLE 3

Exemplary Composition of Aggregate Component

| Ingredient Type | Ingredient | Weight Percent |
|---|---|---|
| Granules | Poraver® 0.25 to 0.5 (expanded glass granules) | 50 |
| Granules | Poraver® 0.1 to 0.25 (expanded glass granules) | 25 |
| Microspheres | Fillite® 500 (alumino-silicate microspheres) | 25 |

After each of the components 20, 22, and 24, have been prepared (blocks 42, 44, and 46) the components 20, 22, and 24 may be individually packaged. In certain embodiments, the components 20, 22, and 24 may be prepared in large batches, for example, 76-379 liter (20-100 gallon) batches, and then packaged into smaller containers for distribution. For example, in certain embodiments, the epoxy resin component 20 and the curing agent component 22 may each be packaged into containers, for example, ranging in size from approximately 1.9-3.8 liters (0.5-1.0 gallons). The aggregate component 24 may be packaged into a container, such as a pail, large enough to hold the containers and the aggregate component 24. The containers containing the epoxy resin component 20 and the curing agent component 22 may then be packaged (block 48) together with the pail containing the aggregate component 24 to create the underlayment kit 26. In certain embodiments, the underlayment kit 26 may contain approximately 5 parts by weight of the epoxy resin component 20, 1 part by weight of the curing agent component 22, and 2 parts by weight of the aggregate component 24. Moreover, in certain embodiments, the underlayment kit 26 may contain approximately 4.46 kilograms (9.84 pounds) of the epoxy resin component 20, approximately 0.96 kilograms (2.12 pounds) of the curing agent component 22, and approximately 2.07 kilograms (4.56 pounds) of the aggregate component 24. However, in other embodiments, the weights and/or the part to part ratios of the components 20, 22, and 24 may vary. Further, in certain embodiments, the components 20, 22, and 24 may be sold and/or packaged separately.

The above preparations (blocks 42, 44, and 46) may involve low-speed and/or high-speed mixing of the raw materials, preparing stock solutions or premixes, cooling the epoxy resin component 20, the curing agent component 22, and/or the aggregate component 24 at intermediate and final steps, and so on. Further, equipment such as vessels, piping, valves, transfer pumps, vacuum pumps and jet, mixers (e.g., high speed agitators or disposers), and so forth, may be employed. Moreover, as described above with respect to FIG. 3, the epoxy resins 20, the curing agent component 22, and the aggregate component 24 may be packaged into an underlayment kit 26 or sold as individual components designed to be used together. The underlayment kits 26 and/or the individual components 20, 22, and 24 may be stored in inventory by the manufacturer, the distributor, the end-user, or may be mixed together and applied soon after transport without intermediate storage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A self-leveling flooring underlayment kit, comprising:
an epoxy resin component comprising one or more Bisphenol F based epoxy resins, or one or more Bisphenol A based epoxy resins, or combinations thereof;
a curing agent component comprising one or more amine based curing agents configured to cure the epoxy resin component upon mixing; and
an aggregate component comprising expanded glass granules and hollow glass microspheres, wherein the hollow glass microspheres comprise alumino-silicate microspheres, and wherein a majority of the expanded glass granules have a largest cross-sectional diameter greater than or equal to approximately 0.1 mm and less than or equal to approximately 2.0 mm, wherein a majority of the hollow glass microspheres have a largest cross-sectional diameter greater than or equal to approximately 5 microns and less than or equal to approximately 500 microns, and wherein the expanded glass granules and the hollow glass microspheres are configured to be suspended within the epoxy resin component and the curing agent upon mixing to form the self-leveling flooring underlayment.

2. The underlayment kit of claim 1, wherein the epoxy resin component comprises a Bisphenol F derived liquid epoxy resin with an epoxide equivalent weight of approximately 160 to 195 grams per equivalent, or a Bisphenol A derived liquid epoxy resin with an epoxide equivalent weight of approximately 180 to 195 grams per equivalent, or a combination thereof.

3. The underlayment kit of claim 1, wherein the epoxy resin component comprises at least one of an epoxy based resin, a diluent, a flame retardant, and an additive.

4. The underlayment kit of claim 1, wherein the epoxy resin component comprises approximately 20 to 24 percent by weight of epoxidized Bisphenol F based resins, approximately 7 to 11 percent by weight of glycidyl ether diluents, approximately 65 to 69 percent by weight of flame retardants, and approximately 0 to 4 percent by weight of additives.

5. The underlayment kit of claim 4, wherein the additives comprise wetting and dispersing additives, thixotrope additives, foam reducing additives, and pigments, and wherein the flame retardants comprise isodecyl diphenyl phosphate, zinc borate, aluminum trihydrate, magnesium hydroxide, and polychlorinated aliphatic compounds.

6. The underlayment kit of claim 1, wherein the epoxy resin component comprises approximately 20 to 24 percent by weight of epoxidized Bisphenol F resins, approximately 7 to 11 percent by weight of glycidyl ether diluents, approximately 13 to 17 percent by weight of isodecyl diphenyl phosphate, approximately 5 to 9 percent by weight of a polychlorinated aliphatic compound, approximately 11 to 15 percent by weight of aluminum trihydrate, approximately 16 to 20 percent by weight of magnesium hydroxide, approximately 13 to 17 percent by weight of zinc borate, and approximately 0 to 4 percent by weight of additives.

7. The underlayment kit of claim 1, wherein the curing agent component comprises at least one of an aliphatic amine, a cycloaliphatic amine, an amidoamine, or a polyamide, or combinations thereof.

8. The underlayment kit of claim 1, wherein the curing agent component comprises approximately 55 to 59 percent by weight of a cycloaliphatic amine curing agent, approximately 2 to 6 percent by weight of an aliphatic amine curing agent, approximately 14 to 18 percent by weight of a polyamine curing agent, approximately 12 to 16 percent by weight of one or more tertiary amine curing agents, and approximately 6 to 10 percent by weight of isodecyl diphenyl phosphate.

9. The underlayment kit of claim 1, wherein the expanded glass granules comprise at least one of expanded glass beads, pretreated expanded glass beads, or water pretreated expanded glass beads, or combinations thereof.

10. The underlayment kit of claim 1, wherein the aggregate component comprises approximately 75 percent by weight of the expanded glass granules and approximately 25 percent by weight of the hollow glass microspheres, and wherein the expanded glass granules comprise expanded glass beads.

11. The underlayment kit of claim 1, wherein the aggregate component comprises approximately 50 percent by weight of expanded glass beads each with a largest cross-sectional diameter greater than or equal to approximately 0.25 mm and less than or equal to approximately 0.5 mm, approximately 25 percent by weight of expanded glass beads each with a largest cross-sectional diameter greater than or equal to approximately 0.1 mm and less than or equal to approximately 0.25 mm, and approximately 25 percent by weight of alumino-silicate microspheres.

12. The underlayment kit of claim 1, wherein the underlayment kit comprises approximately 5 parts by weight of the epoxy resin component, approximately 1 part by weight of the curing agent component, and approximately 2 parts by weight of the aggregate component.

13. A flooring comprising:
a substrate; and
a self-leveled underlayment disposed on the substrate, the underlayment comprising a mixture of:
an epoxy resin component;
a curing agent component; and
an aggregate component;
wherein the underlayment has a weight of less than approximately 1.6 lb/ft$^2$ when applied at a nominal thickness of 0.25 inches and complies with International Maritime Organization Resolution MSC.61(67).

14. The flooring of claim 13, wherein the underlayment complies with the Smoke and Toxicity Test specified in Part 2 and the Test for Surface Flammability specified in Part 5 of the International Maritime Organization Resolution MSC.61(67).

15. The flooring of claim 13, wherein the underlayment meets the requirements for Class 2 Type I and/or Class 2 Type II underlay materials specified in Military Specification MIL-PRF-3135H.

16. The flooring of claim 13, wherein the underlayment comprises approximately zero volatile organic content.

17. The flooring of claim 13, wherein the underlayment comprises a weight of approximately 1.1 to 1.3 lb/ft$^2$ when applied at a nominal thickness of 0.25 inches.

18. The flooring of claim 13, wherein the underlayment comprises a compressive strength of approximately 2000 to 25000 psi per ASTM C579-01.

19. The flooring of claim 13, wherein the underlayment comprises a flexural strength of approximately 1200 to 1400 psi per ASTM C293-08.

20. The flooring of claim 13, wherein the underlayment comprises a tensile strength of approximately 600 to 800 psi per ASTM D412-06ae2.

21. The flooring of claim 13, wherein the underlayment is substantially nonporous.

22. A method of making a self-leveling underlayment kit, comprising:
mixing one or more epoxidized Bisphenol F resins, one or more glycidyl ether diluents, one or more flame retardants, and one or more additives to form an epoxy resin component;
mixing one or more amine based and/or waterborne curing agents to form a curing agent component;
mixing expanded glass granules with a largest cross-sectional diameter greater than or equal to approximately 0.1 mm and less than or equal to approximately 2.0 mm and hollow glass microspheres with a largest cross-sectional diameter greater than or equal to approximately 5 microns and less than or equal to approximately 500 microns to form an aggregate component, wherein the hollow glass microspheres comprise alumino-silicate microspheres; and
packaging the epoxy resin component, the curing agent component, and the aggregate component together to form the self-leveling underlayment kit.

23. The method of claim 22, wherein mixing one or more epoxidized Bisphenol F resins, one or more glycidyl ether diluents, one or more flame retardants, and one or more additives to form an epoxy resin component comprises:
mixing the epoxidized Bisphenol F resins and the glycidyl ether diluents together to form a mixture; and
adding the flame retardants and the additives to the mixture.

24. The method of claim 22, wherein packaging comprises packing an epoxy resin component container and a curing agent component container within an aggregate component container.

25. The method of claim 22, wherein the self-leveling underlayment kit comprises a weight of approximately 1.3 to 1.6 lb/ft$^2$ when applied at a nominal thickness of 0.25 inches.

26. The flooring of claim 13, wherein the underlayment comprises a weight of approximately 1.3 to 1.6 lb/ft$^2$ when applied at a nominal thickness of 0.25 inches.

* * * * *